Howland & Palser. Sheet 1. 2 Sheets.

Pulp Digester.

No. 996. Reissued Jul. 3, 1860.

Howland & Palser. Sheet 2, 2 Sheets.
Pulp Digester.

No. 996. Reissued Jul. 3, 1860.

UNITED STATES PATENT OFFICE.

JOSEPH B. PALSER AND GARDNER HOWLAND, OF FORT EDWARD, N. Y.

IMPROVEMENT IN APPARATUS FOR THE MANUFACTURE OF PAPER-PULP.

Specification forming part of Letters Patent No. 24,484, dated June 21, 1859; Reissue No. 996, dated July 3, 1860.

*To all whom it may concern:*

Be it known that we, JOSEPH B. PALSER and GARDNER HOWLAND, of Fort Edward, in the county of Washington, in the State of New York, have invented certain new and useful Improvements in the Manufacture of Paper-Pulp from Straw and other Fibrous Materials; and we do hereby declare that the following is a full and exact description thereof, reference being had to the accompanying drawings, making a part of this specification, in which—

Figure 1:
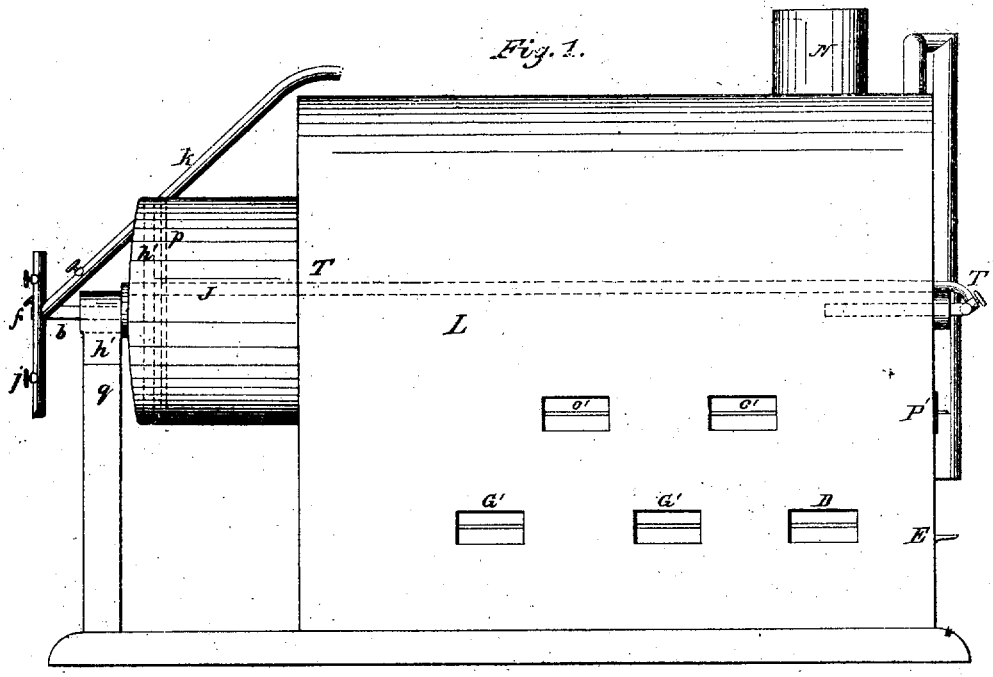
Figure 3:
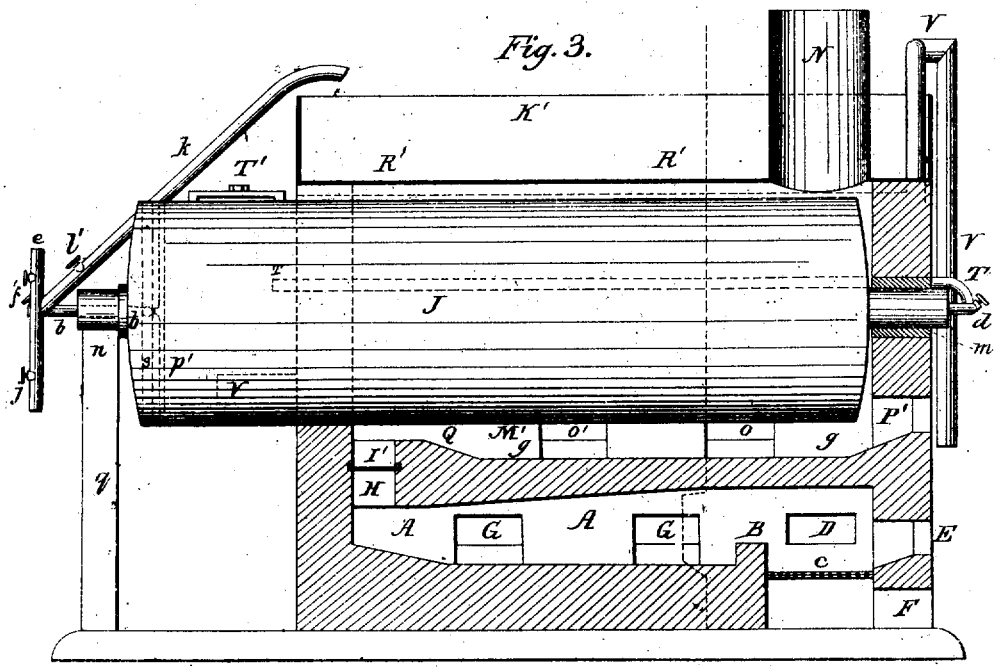
Figure 2:
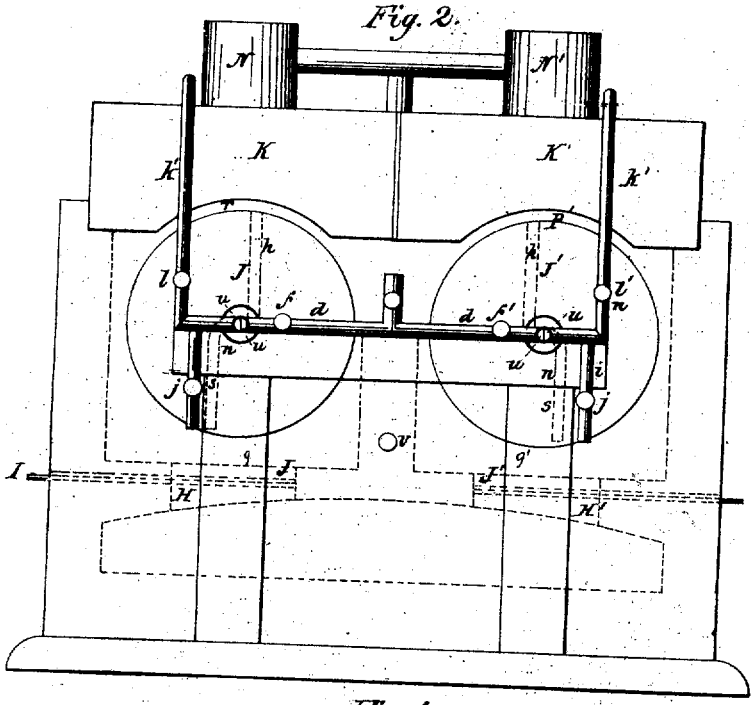
Figure 4:
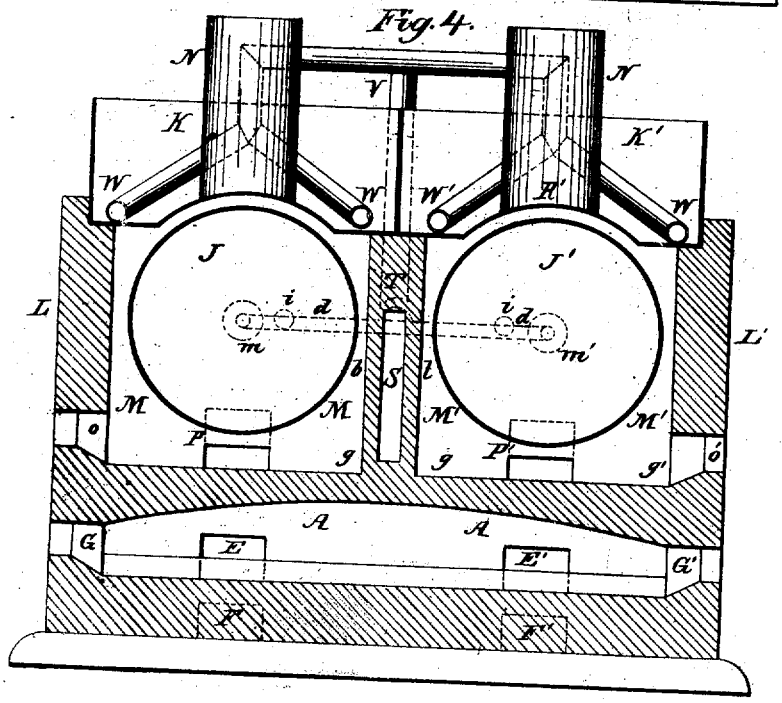

Figure 1 is a side view; Fig. 2, an end view; Fig. 3, a longitudinal section; Fig. 4, a transverse section.

Similar letters of reference indicate corresponding parts in the several figures.

Our apparatus consists of a reverberatory furnace, upon which stand side by side two rotary boilers, each inclosed in a separate envelope, the whole being crowned with two iron vats, one over each boiler.

To enable others skilled in the art to make and use our invention, we will proceed to describe its construction and operation.

In the accompanying drawings, A A is the reverberatory furnace; B, the fire-bridge; C, the fire-place; D D′ and E E′, the fire-doors; F F′, ash or draft openings; G G and G′ G′, doors to the reverberatory furnace; and H′ H′ are two passages, which may be closed by the sliding valves I I′.

J J′ are two rotary boilers; K K′, two iron vats above the boilers.

L L and L′ L′ are brick, which inclose the boilers and support the vats K K′.

M M M′ M′ are spaces between the envelopes and the boilers, forming a flue.

N N are chimneys leading from the spaces M M M′ M′ into the open air. Through the vats O O P and O′ O′ P′ are doors, giving access to the spaces M M M′ M′. The sills of these doors are a few inches higher than the floor of the spaces M M M′ M′, and these floors are raised at Q Q′ to prevent liquids running into the oven or reverberatory furnace below. The doors G G G′ G′ are higher than the floor of the furnace A A for the same reason. Part of the bottoms of the vats K K′ are made cylindrical, to encircle the boilers and form the upper part of the boiler-envelope.

R R R′ R′ are holes, closed with plugs, through which the liquid is dropped from the vats over the rotary boilers. Inside the walls which separate the two boilers are a longitudinal passage, S S, and a pipe, T, for warming air and water, respectively. Air is forced by a blowing-engine through pipe U and passage S S. At the other end of this passage the air goes through a pipe, V, and branch pipes W W W′ W′, and escapes through a number of small holes into the liquid contained in the vats, for the purpose of accelerating its evaporation. The pipe T leads from a reservoir of water or other liquid placed on a higher level than both rotary boilers, and it permits such liquids to be warmed when needful in their passage through this pipe. The pipe T T′ is divided into two branch pipes, *d* and *d′*, each of which turns into one of the boilers through stuffing-boxes in the journal, and is provided with a faucet, *c c′*. The pipe T T′ and branches *a a′* are used to fill the boilers with water or other liquids. At the other end of the boilers pipes *b b′* enter therein through journals *n n′*. These pipes are divided lengthwise into two pipes, V V′ and *u u′*, by partitions. (Shown in Fig. 2.) The pipes V V′ are intended for steam, and are united together by a pipe, *d d′*, provided with faucets *f f′*. On the pipe *d d′* is a branch pipe, *e*, on which a safety-valve and a steam-gage may be placed. The pipes *d d′* and *v v′* are united with the upper portions or steam-chambers of the boilers by pipes *h h′*. Also, with the liquid portions by W and J. The pipes *u u′* are used to empty the boilers from liquids. These pipes extend to the lowest parts of the boilers by pipes S S′, and the liquids which are forced out through them may be sent into the vats K K′ through pipes *k k′*, or may be discharged into the gutter through pipes *i i′*. The pipes *h h′* and *s s′* are separated from the "stock" in the boiler by the perforated partitions *p p p′ p′*, and thus they cannot be broken or even bent by the pressure of the revolving stock, nor can they be closed by solid matters accidentally forced into them. The partition *p p′* serves also as a strainer to retain the stock in its own apartment and yet permit the drawing off of all the liquid matters at any desired time during the operation hereinafter to be described.

The described arrangement of perforated partitions and pipes may be varied in several ways substantially the same. The rotary boilers J J′ are supported as usual in bearings *m m′* and *n n′*. One end, *m m′*, of each of the rotary boilers and a large portion of their surfaces are enveloped by the furnace. The other end, *n n′*, projects out sufficiently to leave room for man-holes *r r′*, and as a consequence the journals at this end are supported on a frame, *q q′*, separated from the furnace. The other end works in boxes built in the wall of the furnace itself. The straw is first cut into suitable lengths, subjected to a winnowing process to cleanse it from dirt, &c., and then crushed between a pair of iron rollers. It is now ready to be acted upon by boiling. One of the boilers, J having been emptied of its contents during the time the other, J′, was boiling, (and this boiling under high pressure being just completed,) things are ready for another operation, which is conducted as follows:

First. The boiler J is filled with straw or other substance to be boiled through the man-hole *r*, which is then closed.

Second. The pipe T is connected with the reservoir of liquid, and by opening the faucet *c* the necessary quantity flows into the boiler J, and the faucet is then closed.

Third. The valve I′ is closed, and the valve I is open, and thus fire-heat is transferred from boiler J′ to boiler J.

Fourth. The faucets *f f′* are opened, and steam rushes from the boiler J′ to boiler J until the temperature and pressure are equal in both. The faucets are then closed. This operation is very important, is the means of raising the temperature in the boiler J in a much shorter time than can be done by fire-heat alone. It also assists in cooling the boiler J′; both of these effects being produced with an economy of time, labor, and fuel. Another important advantage of this discharge of the steam from one boilor into the other is that the steam by the boiling process becomes charged more or less with alkaline matter, which is carried over and mixed with the contents of the other boiler. A saving of alkali and of the heating thereof is thereby effected.

Fifth. The faucet *l′* is opened, and the steam remaining in the boiler J′ forces up the exhausted liquid into the vat placed above the boiler, after which the faucet is closed.

Sixth. The plugs are drawn out of the holes R′ R′, and the liquid previously raised to the vat is discharged in suitable quantities at a time upon the top of the boiler that is immediately below. The exterior of this boiler becomes instantly enveloped by the descending liquid, parts of which, by contact with the upper surface of the boiler, are scattered and dash against the surrounding walls, and thus coats them also. The result is that a rapid and extensive evaporation of the liquid takes place, being brought about by the dashing of the liquid upon the boiler and surrounded heated walls as aforesaid. It is requisite that the heated surfaces of these parts should be cooled as rapidly as possible in order that a new charge of material may be placed within the boiler. The descending liquid thickens by the evaporation and falls into the basin *g*, where it is collected and soon becomes viscous. This method of cooling the boiler and also evaporating the liquid refuse presents an important advantage in the economy of time and fuel.

Seventh. The pipe T is adjusted to the reservoir of water to wash the materials in the boiler J′, which are finally emptied through the man-hole.

Eighth. After boiling has been going on for the requisite time in the boiler J the liquid from the preceding operation in *g g*, has become viscous, and is pushed over Q into A A, where the inflammable matters take fire, and the boiling proceeds with the heat produced by them, the fire in the grate C being kept as low as possible. In fact, the only reason for keeping it up at all is to avoid the trouble of rekindling it for beginning the next operation. In such operations as the boiling of rags, &c., there is no residuum to burn. The oven or furnace would then be reduced to a flue and the vats K K′ suppressed, except the strength of the liquor used was so sufficient that by recovering its alkali the expense of evaporating it would be repaid.

In the manufacture of pulp from straw and other fibrous materials we employ sixty gallons of caustic alkali of a strength indicating from $3\frac{1}{2}$° to $3\frac{3}{4}$° Baumé to every one hundred pounds of the cut straw. The alkaline mixture and straw having been placed in the steam-boiler and the man-hole in the latter closed, fire is applied below and a pressure of one hundred and ten pounds to one hundred and thirty pounds to the square inch is raised. This pressure is maintained for four hours, the boiler being constantly but slowly rotated, and the stock within the boiler being thus kept in gentle agitation.

Having thus described our invention, we claim as new and desire to secure by Letters Patent—

1. Having the pipe *v*, which passes through the hollow journal of the boiler, divided by a partition, so that the steam may find exit through one compartment of the pipe and the contents of the boiler through the other compartment, as set forth.

2. The employment of the perforated diaphragm *p p′*, when arranged substantially as described, to protect the pipes *h h′ s s′* and strain the liquors from the stock, as and for the purposes herein set forth.

3. The arrangement of the boilers J J′ with the surrounding envelope substantially as herein shown and described, so that the resultant liquids of the boiling may be evaporated and also employed to cool down the boilers and surrounding envelope, as set forth.

4. The arrangement of the basin *g g* below the boiler to receive the falling liquid, as and for the purposes described.

5. We do not claim, broadly, the transferring of steam from one steam-boiler to another, but we claim the injection of the steam arising from the boiling of the alkaline and other contents of boiler J′ into the boiler J, and vice versa, substantially as and for the purposes herein shown and described.

6. We claim the arrangement of the warming-chamber S between the two boilers, and the combination therewith of the pipes T V W W, as and for the purposes described.

7. We claim the arrangement and combination of the boilers J J′, furnace A, and doors D D′ E E′ F F′ so as to apply the furnace-heat to either or both boilers at pleasure, substantially as herein shown and described.

8. We claim the combination of the cylindrical-bottomed vats K K′, having the chimneys N N passing through them, with the boilers J J′, as and for the purposes described.

JOSEPH B. PALSER.
GARDNER HOWLAND.

Witnesses:
JAMES L. REYNOLDS,
ROBERT EDWARDS.